C. M. SORENSEN.
SURGICAL CASE.
APPLICATION FILED APR. 16, 1915.

1,184,494.

Patented May 23, 1916.
2 SHEETS—SHEET 1.

WITNESSES:

INVENTOR
Charles M. Sorensen

BY
ATTORNEYS

C. M. SORENSEN.
SURGICAL CASE.
APPLICATION FILED APR. 16, 1915.
1,184,494.
Patented May 23, 1916.
2 SHEETS—SHEET 2.
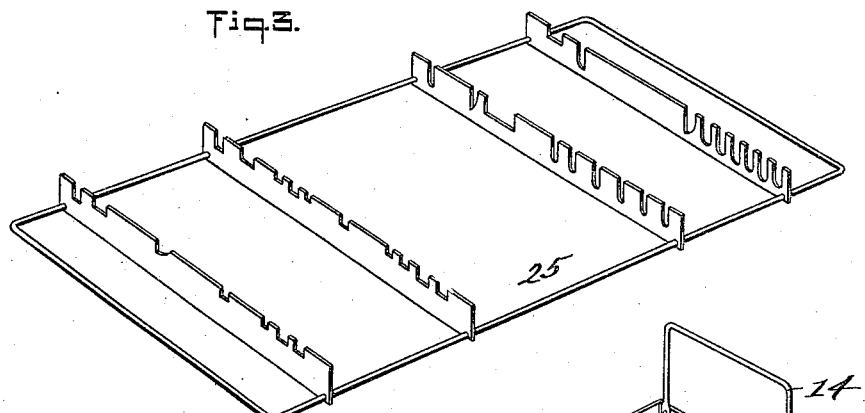
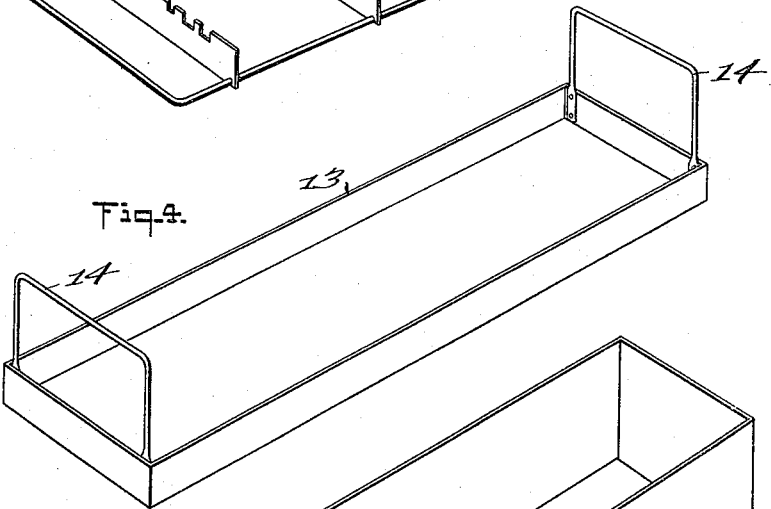
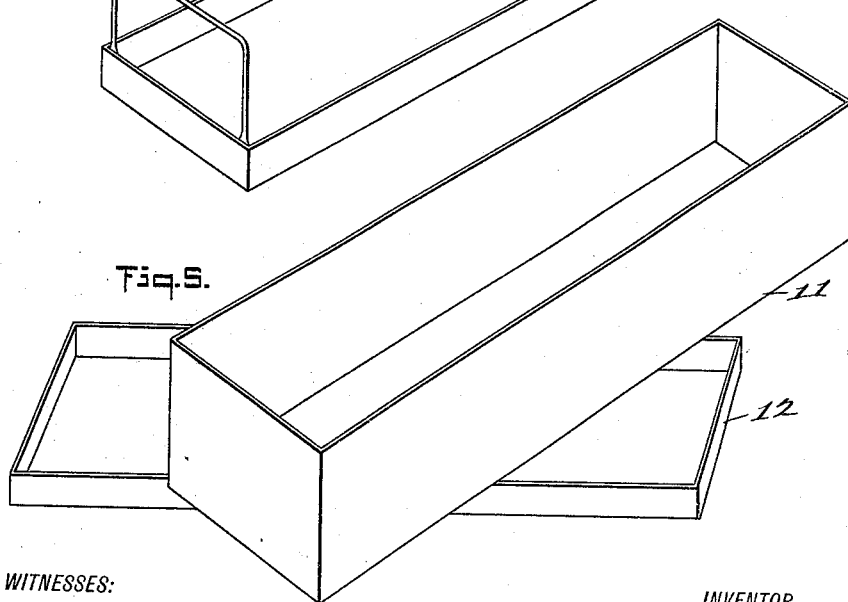
WITNESSES:
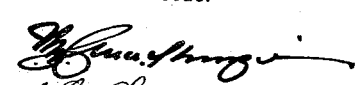
INVENTOR
Charles M. Sorensen
BY 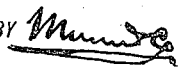
ATTORNEYS

UNITED STATES PATENT OFFICE.

CHARLES M. SORENSEN, OF NEW YORK, N. Y.

SURGICAL CASE.

1,184,494.  Specification of Letters Patent.  Patented May 23, 1916.

Application filed April 16, 1915. Serial No. 21,877.

*To all whom it may concern:*

Be it known that I, CHARLES M. SORENSEN, a citizen of the United States, and a resident of New York, in the county of New York and State of New York, have invented certain new and useful Improvements in Surgical Cases, of which the following is a specification.

My invention relates to cases for carrying instruments, bandages, adhesive tape, absorbent cotton, bottles and jars for desired liquids and pastes, etc., required by surgeons, chiropodists, dentists, or others in the performance of their professional duties, particularly when called away from their offices, and the main object of the invention is to provide a case fully equipped with all the requirements in a readily accessible manner, and which also carries a sterilizing outfit for the instruments ready for use before, during, or after use of the instruments.

My invention is fully described in the following specification, of which the accompanying drawings form a part, in which like characters refer to like parts in each of the views, and in which:—

Figure 1:
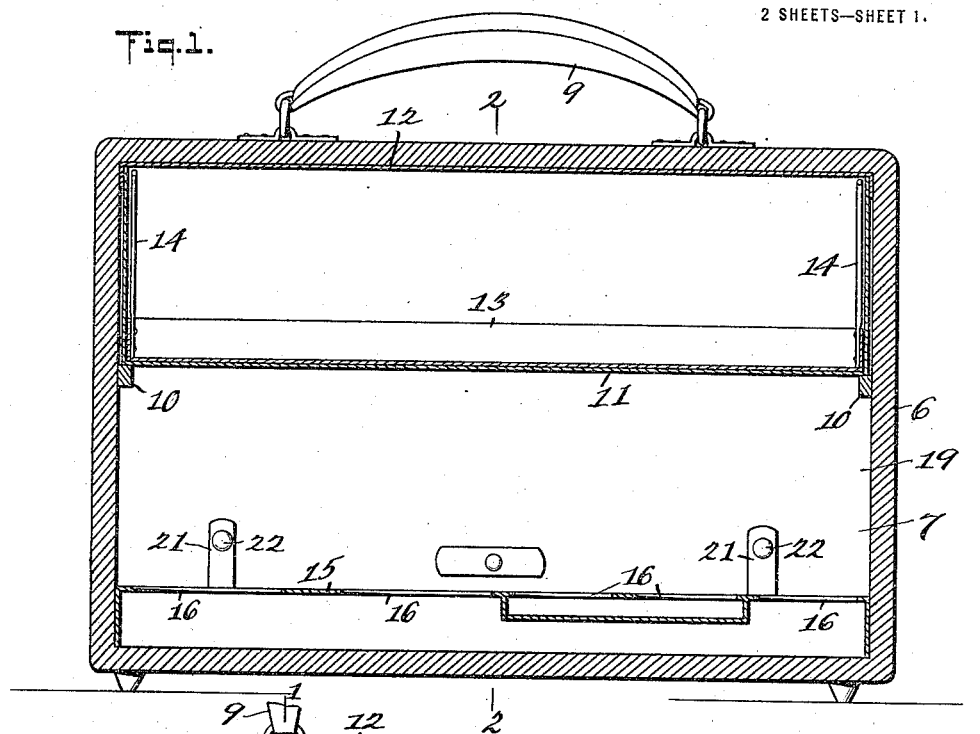
Figure 2:
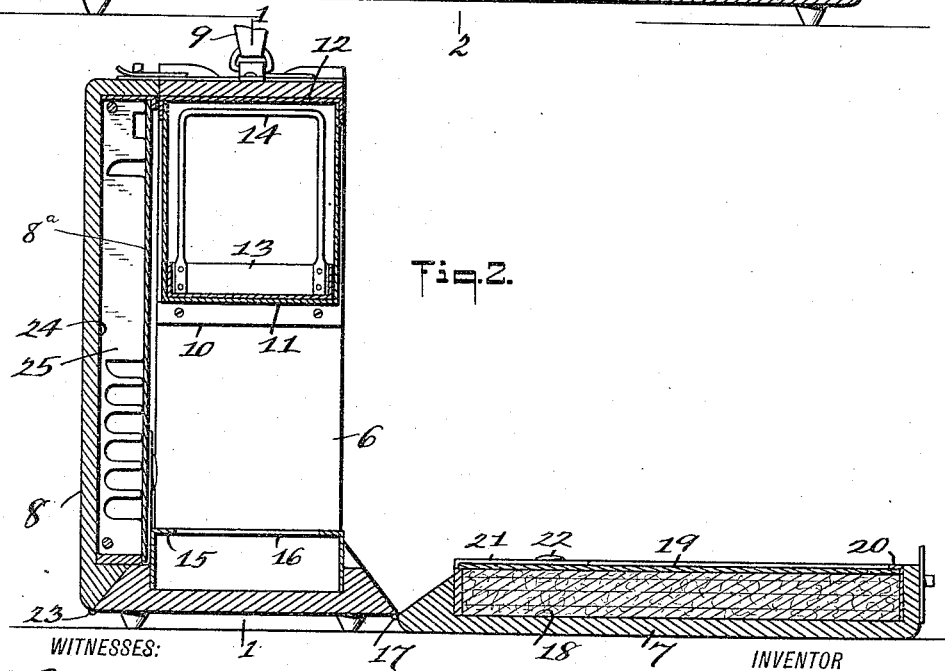

Figure 1 is a central, longitudinal, vertical, section taken through a carrying case constructed in accordance with my invention, with the professional paraphernalia removed therefrom; Fig. 2 is a transverse, vertical, central, section thereof, with one lid opened; Fig. 3 is a detached, perspective, view of a tray for the instruments; Fig. 4 is a detached, perspective, view of a sterilizer pan which I provide; and Fig. 5 is a similar view of a sterilizer tank and cover therefor which is adapted to receive the pan shown in Fig. 4.

In the drawings forming a part of this application I have shown a present preferred embodiment of my carrying case, consisting of a body portion or frame 6 open at both sides, a lid 7 on one side, a lid 8 on the opposite side, and a handle 9 for carrying the same secured to the top of the frame 6.

The frame 6 is of rectangular form and is provided with two cleats 10, one on the inner side of each end thereof, serving as supports for a removable tank 11 having a removable cover 12 therefor, and within said tank is a removable pan 13 of relatively slight depth provided with end handles 14 reaching close to the upper edge of said tank whereby they may be readily grasped to remove the pan from the tank, and I may if desired, although not shown, perforate the bottom of the pan to permit the sterilizing solution to enter and escape from said pan when the latter is placed within or removed from the tank.

Beneath the cleats 10 is a rack 15 provided with a plurality of suitable openings 16 therethrough for the reception of bottles, jars, etc., containing the liquid or paste materials used by the owner of the case in his professional capacity, and this rack may be made of any desired form to adapt the case to the professional use of the owner. The lid 7 is hinged to the bottom of the box at 17 in such manner as to lay flat upon a table or the like when opened, as clearly shown in Fig. 2, and said lid has a recess 18 therein over which is a detachable cover 19 held in place by means of clips 20 in stationary positions and straps 21 provided with the usual glove or snap fasteners 22; this recess serves as a receptacle for cotton, bandages, or the like or, if the case is equipped for a chirpodist, may contain felt pads or sheets such as are used in this profession. The lid 8 is similarly hinged at 23 and recessed at 24 to receive an instrument tray 25 consisting, in the form shown, of a frame and suitably spaced vertical plates having notches or detents in the upper edges thereof to adapt the same to the instruments to be carried and to maintain said instruments in spaced relationship to prevent injurious contact therebetween, and, when the lid 8 is lowered into the position of the lid 7 in Fig. 2, it will be seen that all of the instruments are exposed and within instant reach of the surgeon when needed. I also provide a cover 8ª for the instrument tray 25.

In practice, I will provide a small spirit-lamp in the bottle rack 15, this not being shown as it may be of any desired form, and, when the carrying case is opened for use, the tank 11 may be partially filled with a sterilizing solution and heated by said lamp if desired, or the tank may be removed from the case and placed upon a stove if one is convenient and it is desired to heat the solution, although it may not always be necessary nor even desirable to heat the solution.

After an instrument has been used it may be placed in the pan 13, previously removed from the tank, and said pan then lowered into the solution in the tank, where it may remain until thoroughly sterilized and antiseptic, after which the pan with its contained instrument or instruments may be lifted from the tank, and the instrument removed therefrom and dried, ready for subsequent use.

It will be noted that, aside from the particular instruments carried, this being within the discretion of the owner, a complete outfit of accessories is provided, both the instruments and accessories being in immediately accessible positions, this being highly important in all classes of surgery, and the owner may be assured that his instruments are aseptic for subsequent use at another place without the necessity for a return to his office or carrying extra instruments.

My carrying case is very compact, very neat in appearance, and may be made of a suitable size to adapt it to a particular use, the sterilizing outfit, however, forming an essential part thereof.

Having fully described my invention, what I claim as new, and desire to secure by Letters Patent, is:—

A surgical case, comprising a frame open at its sides, a lid hinged to each open side thereof, an instrument tray in one lid, a cover for the other lid forming a receptacle, a bottle rack at the bottom of said frame, cleats on the inner sides of the ends of said frame, a sterilizing tank held on said cleats above said bottle rack, and an instrument pan removably held in said tank.

In testimony whereof I have signed my name to this specification in the presence of two subscribing witnesses.

CHARLES M. SORENSEN.

Witnesses:
J. C. LARSEN,
PHILIP D. ROLLHAUS.

Copies of this patent may be obtained for five cents each, by addressing the "Commissioner of Patents, Washington, D. C."